United States Patent [19]

Nagayama

[11] Patent Number: 5,429,466
[45] Date of Patent: Jul. 4, 1995

[54] TEE NUT

[75] Inventor: Yutaka Nagayama, Osaka, Japan

[73] Assignee: Nagayama Electronic Industry Co. Ltd., Wakayama, Japan

[21] Appl. No.: 206,969

[22] Filed: Mar. 7, 1994

[30] Foreign Application Priority Data

Jul. 2, 1993 [JP] Japan ................ 5-164797

[51] Int. Cl.⁶ ................ F16B 37/04; B21D 39/00
[52] U.S. Cl. ................ 411/179; 411/181; 411/183; 29/524.1
[58] Field of Search ............ 411/177, 179, 180, 181, 411/183, 3-5; 29/524.1, 525.2

[56] References Cited

U.S. PATENT DOCUMENTS

| | | | |
|---|---|---|---|
| 1,112,525 | 10/1914 | Darling | 411/181 |
| 2,102,558 | 12/1937 | Johnson | 411/177 |
| 3,281,171 | 10/1966 | Hughes | 411/179 X |
| 3,910,331 | 10/1975 | Randall | 411/181 |
| 4,556,350 | 12/1985 | Bernhardt et al. | 411/3 X |
| 4,708,550 | 11/1987 | Hamilton | 411/3 |
| 4,911,592 | 3/1990 | Muller | 411/181 |
| 5,238,344 | 8/1993 | Nagayama . | |

Primary Examiner—Neill R. Wilson
Attorney, Agent, or Firm—W. G. Fasse; W. F. Fasse

[57] ABSTRACT

Disclosed herein is a Tee nut which can form a hole in a work piece with no problem by driving of the Tee nut itself, without previously forming a hole in the work piece. A closure member is engaged in a hollow shaft portion, to divide a portion to be caulked from a female threading carrier portion. A punched-out portion resulting from a hole which is formed by driving of a Tee nut itself is prevented by the closure member from reaching the female threading carrier portion, so that the punched-out portion can be discharged at the same time by extruding the closure member.

11 Claims, 12 Drawing Sheets 5,429,466

TEE NUT

BACKGROUND OF THE INVENTION

1. Field of the Invention

The present invention relates to a Tee nut, and more particularly, it relates to a Tee nut which is provided with a portion to be caulked on its shaft portion.

2. Description of the Background Art

For example, U.S. Pat. No. 5,238,344 describes a conventional Tee nut, which is of interest to the present invention. This Tee nut comprises a shaft portion and a flange portion outwardly extending from a first end of this shaft portion, which are prepared from an integral metal material. The shaft portion is in the form of a hollow cylinder and provided with a portion to be caulked on a second end which is opposite to the first end, while a female threading is formed on its inner peripheral surface excluding the portion to be caulked. Further, a plurality of pawls are provided on the outer peripheral edge of the flange portion, to project toward the second end of the shaft portion. In the shaft portion, the portion to be caulked is reduced in thickness as compared with that provided with the female threading, to facilitate caulking.

The shaft portion is inserted in a hole which is provided in an work piece such as a wood member, for example, and the pawls are driven into the work piece while the portion to be caulked is caulked to be spread on the side of a surface of the object which is opposite to that receiving the flange portion, so that the Tee nut is fixed to the work piece.

The hole provided in the aforementioned work piece is generally formed with a drill, or by punching.

In order to fix the Tee nut to a work piece, a hole for receiving the shaft portion of the Tee nut is generally previously provided in the work piece. When the Tee nut is to be fixed to the work piece by an automatic machine, however, it is necessary to properly align the Tee nut with the hole which is previously provided in the work piece, and relatively high accuracy is required for such alignment. While a relatively large hole may be provided in the work piece to enable rough alignment with the Tee nut, the as-fixed Tee nut is problematically rattled in this case with respect to the work piece.

In order to fix the Tee nut to the work piece, further, a step of providing a hole in the object is required in advance, and hence the number of steps is increased.

SUMMARY OF THE INVENTION

Accordingly, an object of the present invention is to provide a Tee nut, which can omit the aforementioned step of previously forming a hole in an work piece.

The present invention is directed to a Tee nut which comprises a shaft portion and a flange portion outwardly extending from a first end of the shaft portion, which are prepared from an integral metal material. The shaft portion is in the form of a hollow cylinder and provided with a portion to be caulked on a second end which is opposite to the first end, while a female threading is formed on its inner peripheral surface excluding the portion to be caulked. On the other hand, the flange portion is provided with a pawl projecting toward the second end of the shaft portion. The Tee nut according to the present invention is driven into a work piece provided with no hole, so that a hole for receiving the shaft portion is formed in the work piece by the driving itself.

While no formation of a hole has hitherto been executed by the aforementioned driving of a Tee nut, it is possible to sufficiently guarantee that a hole can be formed by driving of the Tee nut itself since it is possible to form a hole in a work piece with application of punching. When the aforementioned driving method is employed, however, a portion (punched-out portion) which is punched out from the hole defined in the work piece fills up a female threading carrier portion provided on the shaft portion, to hinder a bolt from fitting with the Tee nut unless the same is removed. When such a punched-out portion fills up the root of a female threading provided in the female threading carrier portion, it is extremely difficult to remove the same.

In order to solve the aforementioned problem, the present invention is characterized in that a closure member is engaged in the shaft portion to divide the portion to be caulked from the female threading carrier portion.

When the Tee nut according to the present invention is driven into a work piece, the resulting punched-out portion is effectively prevented by the closure member from reaching the female threading carrier portion, although the same enters the hollow shaft portion.

According to the present invention, therefore, it is possible to form a hole for receiving the shaft portion in the work piece by simply driving the Tee nut into the object with no influence exerted by the punched-out portion, thereby efficiently carrying out the operation for fixing the Tee nut to the work piece. In the aforementioned driving, the punched-out portion entering the shaft portion is left in the portion to be caulked by presence of the closure member. When a proper pusher pin is inserted from above the flange portion to extrude the closure member, therefore, it is possible to discharge the punched-out portion simultaneously with the same.

When a hole is formed in the work piece by the Tee nut itself in the aforementioned manner, absolutely no problem is caused on alignment of the hole and the Tee nut while substantially no clearance is defined between the shaft portion and the hole for receiving the same, whereby it is possible to minimize the problem of rattling after fixation of the Tee nut.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
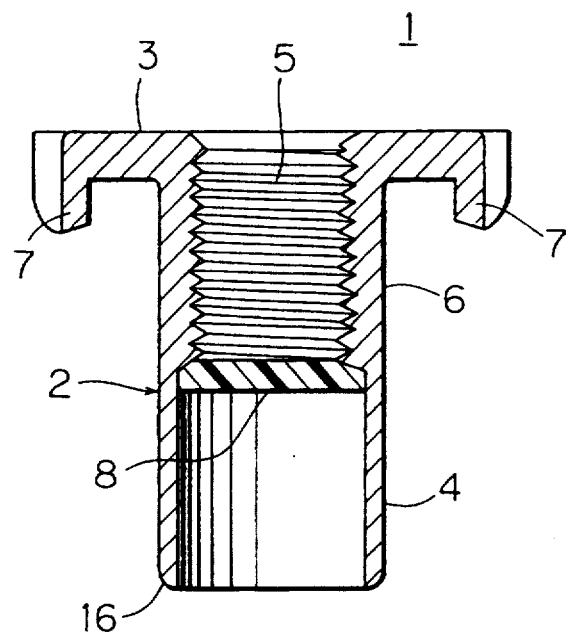
FIG. 1 is a longitudinal sectional view showing a Tee nut 1 according to an embodiment of the present invention.
Figure 2:
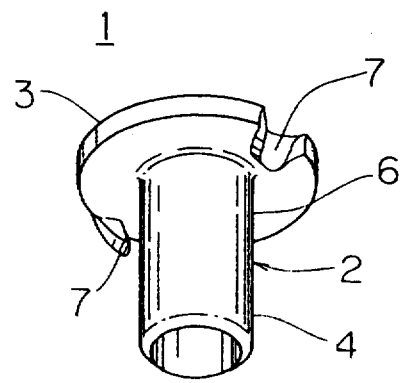
FIG. 2 is a perspective view illustrating the appearance of the Tee nut 1 shown in FIG. 1 from below.

Referring to FIGS. 1 and 2, the Tee nut 1, which is integrally obtained by drawing a ferrous metal plate, for example, comprises a shaft portion 2 and a flange portion 3 outwardly extending from a first end of this shaft portion 2.

The shaft portion 2 is in the form of a hollow cylinder and has a portion 4 to be caulked on its second end which is opposite to the first end, while a female threading 5 is formed on its inner peripheral surface excluding the portion 4 to be caulked. The portion 4 to be caulked has an inner diameter which is preferably made larger than that of a female threading carrier portion 6 provided with the female threading 5, so that the portion 4 to be caulked is smaller in thickness than the female threading carrier portion 6 on the basis of the difference between the inner diameters. Thus, the shaft portion 2 can be threaded from either the first or second end, to be provided with the female threading 5.

Parts of the outer peripheral edge of the flange portion 3 are inwardly crushed from the exterior for forming a plurality of, e.g., two pawls 7 on the flange portion 3 to project toward the second end of the shaft portion 2 at angular spaces of 180°.

A closure member 8 is engaged in the shaft portion 2, to divide the portion 4 to be caulked from the female threading carrier portion 6. In more concrete terms, the closure member 8 is positioned by a step which is formed on the inner peripheral surface of the shaft portion 2, to absorb difference in inner diameter between the portion 4 to be caulked and the female threading carrier portion 6. This closure member 8 can be prepared from an arbitrary material. For example, the closure member 8 can be prepared from resin, a metal, wood or the like. While the closure member 8 is in the form of a relatively thin sheet which is arranged in the vicinity of the boundary between the portion 4 to be caulked and the female threading carrier portion 6 in the embodiment shown in FIG. 1, the same may alternatively be shaped to substantially fill up the space in the portion 4 to be caulked in the shaft portion 2.

This Tee nut 1 is fixed to an work piece 9 which is made of wood, for example, through steps shown in FIGS. 3 to 6 respectively.

Figure 3:
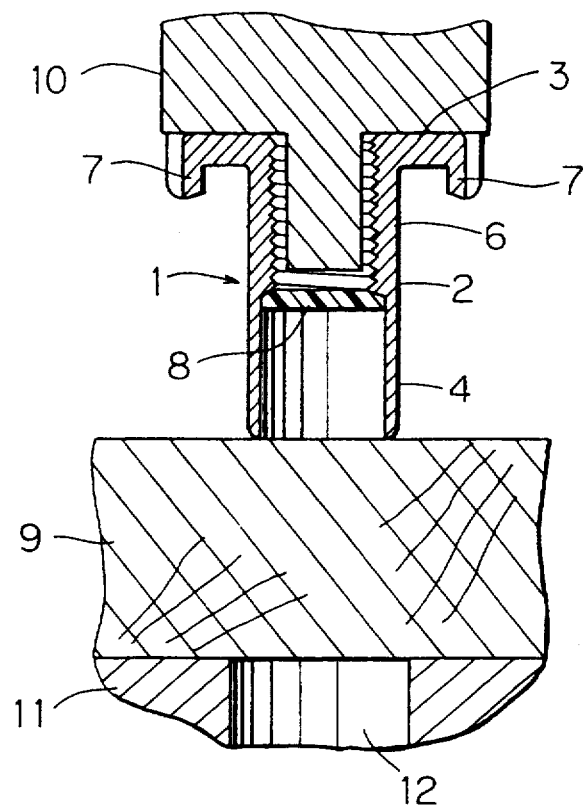
FIG. 3 is a sectional view showing the Tee nut 1 appearing in FIG. 3, which is not yet driven into an work piece 9.

First, the Tee nut 1 is held by a punch 10 which is arranged above the work piece 9, as shown in FIG. 3. At this time, the Tee nut 1 is so held as to direct the portion 4 to be caulked toward the work piece 9. On the other hand, a die 11 is arranged to be in contact with the lower surface of the work piece 9. This die 11 is provided with a cavity 12 in a position corresponding to the shaft portion 2 of the Tee nut 1.

Figure 4:
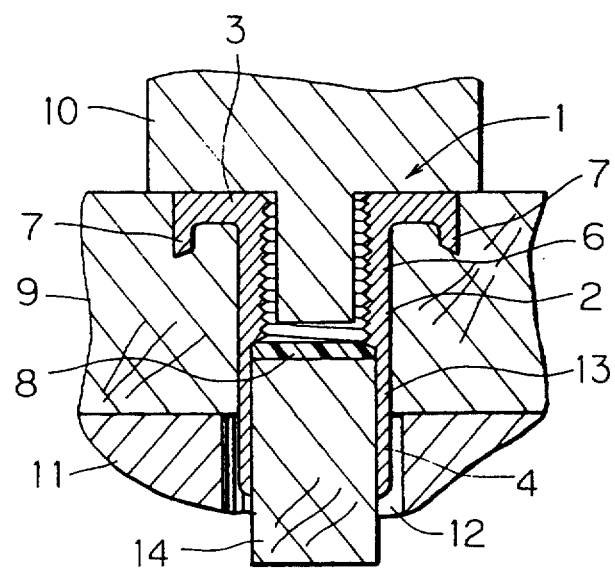
FIG. 4 is a sectional view showing the Tee nut 1 appearing in FIG. 3, which is driven into the work piece 9.

Then, the punch 10 is downwardly moved as shown in FIG. 4, to drive the Tee nut 1 into the work piece 9. At this time, the shaft portion 2 which is advanced into the work piece 9 forms a hole 13 in the work piece 9 to pass through the same, while receiving a punched-out portion 14 resulting from such formation of the hole 13 in the portion 4 to be caulked. Due to presence of the closure member 8, the punched-out portion 14 will not reach the female threading carrier portion 6. Further, the pawls 7 bite into the upper surface of the work piece 9. Referring to FIG. 4, the flange portion 3 also bites into the work piece 9, while only the pawls 7 may bite into the work piece 9. The degree of such biting can be varied with the material of the work piece 9 or force which is applied from the punch 10.

Figure 5:
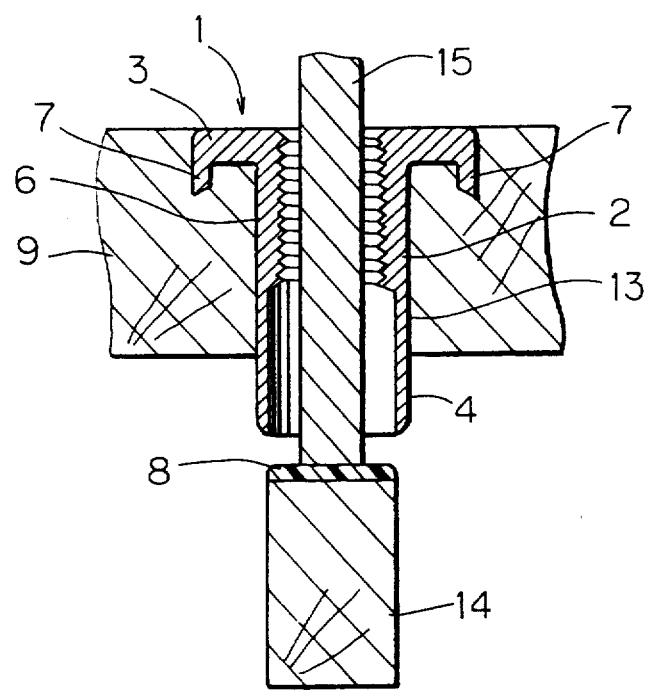
FIG. 5 is a sectional view showing a step of removing a closure member 8 and a punched-out portion 14 shown in FIG. 4.

Then, a push rod 15 is inserted in the shaft portion 2 from above the flange portion 3 as shown in FIG. 5, thereby downwardly extruding the closure member 8. In response to this, the punched-out portion 14 is also discharged from the shaft portion 2.

Figure 6:
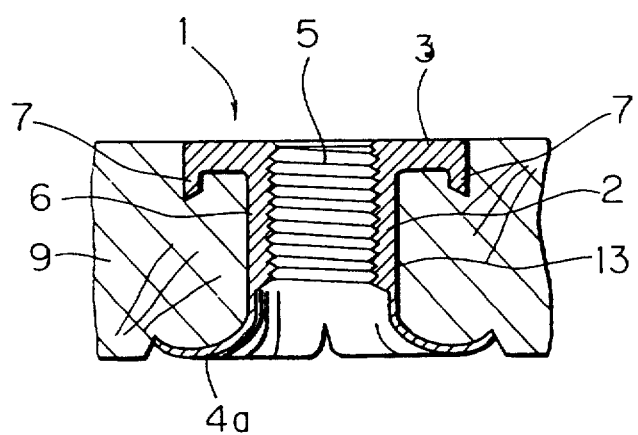
FIG. 6 is a sectional view showing a state of the Tee nut 1 which is driven into the work piece 9 and subjected to caulking.

Then, caulking is applied to the portion 4 to be caulked, to form a caulked portion 4a on the lower side of work piece 9, as shown in FIG. 6. Thus, the Tee nut 1 is completely fixed to the work piece 9.

In the aforementioned embodiment, a rounded surface 16 is formed on an end of the shaft portion 2, as clearly understood from FIG. 1. Such a rounded surface 16 or a tapered surface facilitates formation of the hole 13 in work piece 9 of fixation by biting of the shaft portion 2 itself, while the same is not an essential characteristic of the present invention. For example, the shaft portion 2 may alternatively be provided on its end with an end surface providing a plane extending in a direction perpendicular to the longitudinal direction of the shaft portion 2.

Further, the shapes, dimensions etc. in the various portions of the Tee nut 1 according to the above embodiment are mere examples. Therefore, it is possible to arbitrarily change the shapes of the flange portion 3 and the pawls 7, for example.

Description is now briefly made on some other embodiments which are provided with flange portions 3 and pawls 7 having modified shapes, with reference to FIGS. 7 to 22. Referring to FIGS. 7 to 22, elements corresponding to those shown in FIGS. 1 and 2 are denoted by similar reference numerals, and redundant description is omitted.

Figure 7:
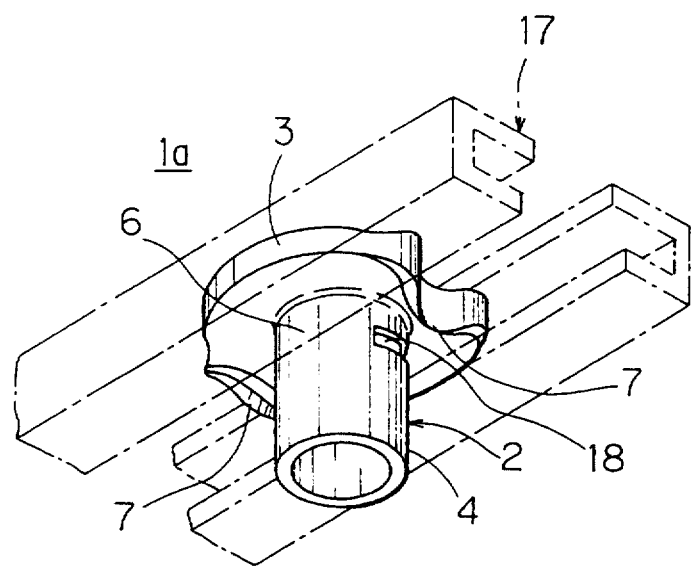
FIG. 7 is a perspective view showing the appearance of a Tee nut 1a according to another embodiment of the present invention from below.
Figure 8:
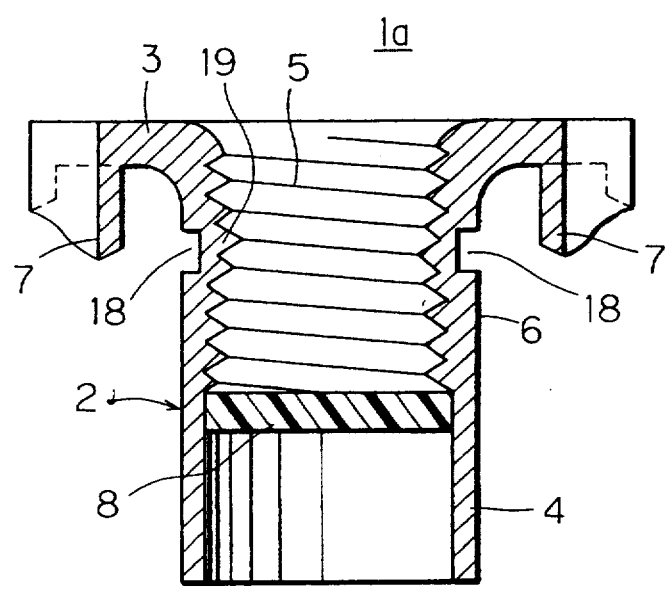
FIG. 8 is a longitudinal cross sectional view of the Tee nut 1a shown in FIG. 7.

In a Tee nut 1a shown in FIGS. 7 and 8, pawls 7 are formed to project with relatively large widths. This Tee nut 1a, which is of a type called a "hopper feed Tee nut", can be smoothly moved along feed trucks 17 shown in phantom lines in FIG. 7, to be automatically fed and fixed to an work piece. On the other hand, parts of a female threading carrier portion 6 of this Tee nut 1a are strongly pressed from the exterior, to be provided with concave portions 18. Due to such formation of the concave portions 18, the thread of a female threading 5 is partially irregularized. Thus, it is possible to prevent a bolt (not shown), which is once fitted with the female threading 5, from loosening by the as-obtained irregular portions 19.

Figure 9:
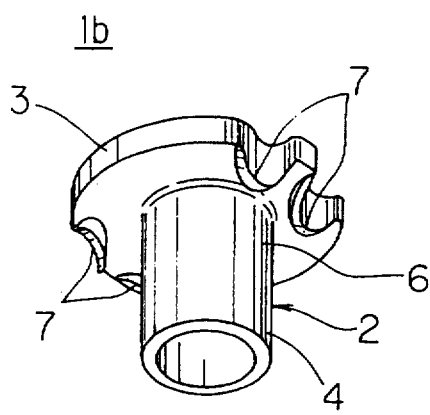
FIG. 9 is a perspective view showing the appearance of a Tee nut 1b according to still another embodiment of the present invention from below.

In a Tee nut 1b shown in FIG. 9, two pawls 7 are provided in proximity to each other on each of positions which are opposed along the radial direction of a flange portion 3. This Tee nut 1b is also of the "hopper feed Tee nut" type.

Figure 10:
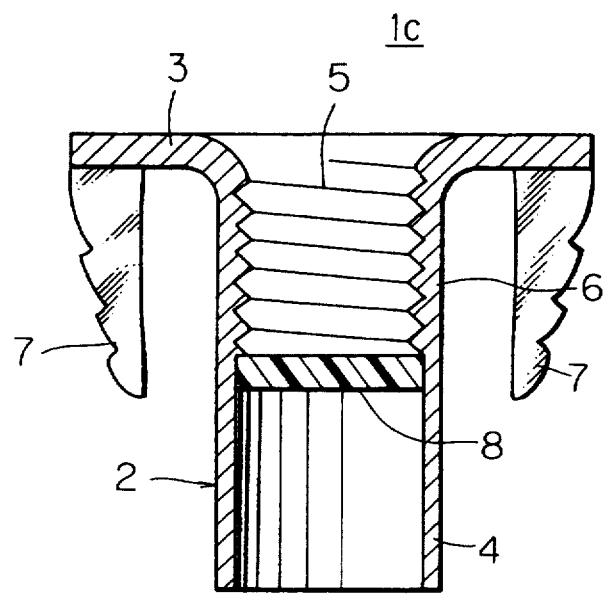
FIG. 10 is a longitudinal sectional view showing a Tee nut 1c according to a further embodiment of the present invention.
Figure 11:
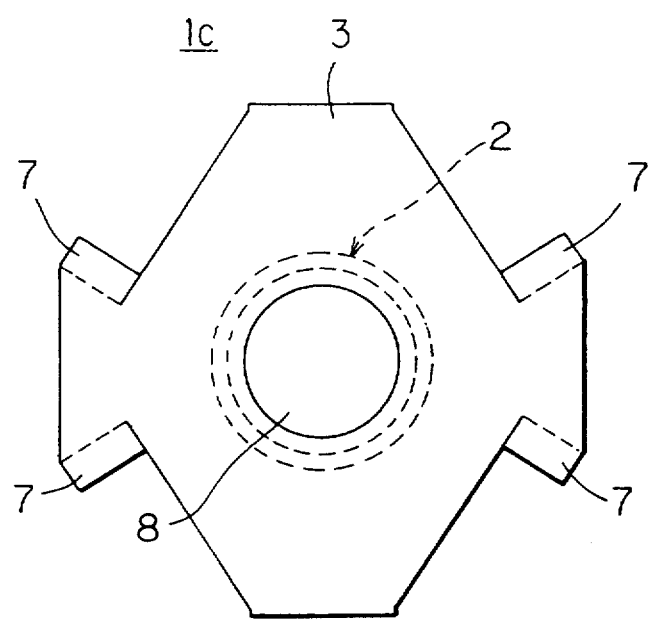
FIG. 11 is a plan view of the Tee nut 1c shown in FIG. 10.

In a Tee nut 1c shown in FIGS. 10 and 11, two pairs of pawls 7 are arranged oppositely along the radial direction of a flange portion 3. These pawls 7 are formed by raising up parts of the outer peripheral edge of the flange portion 3. Further, the pawls 7 are indented respectively. This Tee nut 1c is also of the "hopper feed Tee nut" type.

Figure 12:
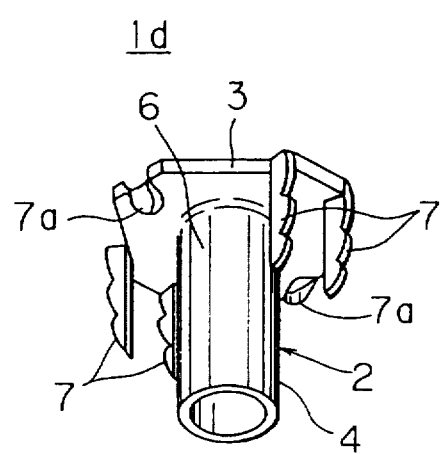
FIG. 12 is a perspective view showing the appearance of a Tee nut 1d according to a further embodiment of the present invention from below.

A Tee nut 1d shown in FIG. 12 is different from the Tee nut 1c shown in FIGS. 10 and 11 in a point that the same are further provided with second pawls 7a on positions opposed to each other along a radial direction which is perpendicular to that opposing two pairs of pawls 7. The second pawls 7a can be formed by a method substantially similar to that for forming the pawls 7 shown in FIGS. 1 and 2.

Figure 13:
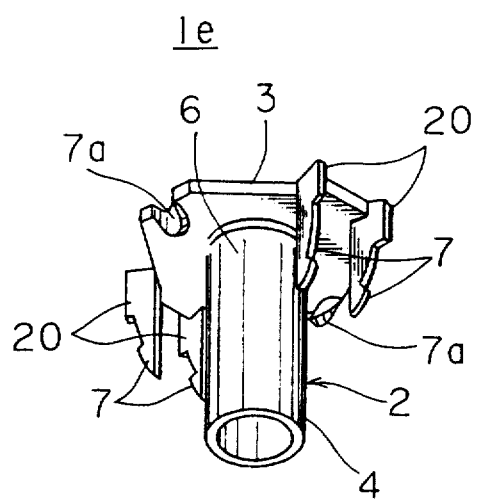
FIG. 13 is a perspective view showing the appearance of a Tee nut 1e according to a further embodiment of the present invention from below.

A Tee nut 1e shown in FIG. 13 is different from the Tee nut 1d shown in FIG. 12 in a point that extending members 20 are provided on respective base portions of pawls 7.

Figure 14:
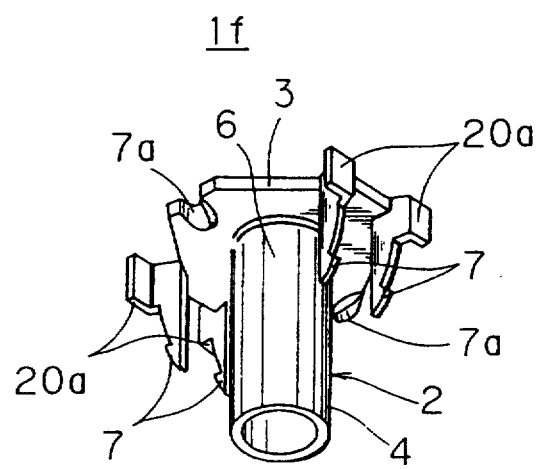
FIG. 14 is a perspective view showing the appearance of a Tee nut if according to a further embodiment of the present invention from below.

A Tee nut 1f shown in FIG. 14 is different from the Tee nut 1e shown in FIG. 13 in a point that extending members 20a which are located in proximity to each other are so bent as to separate from each other.

Figure 15:
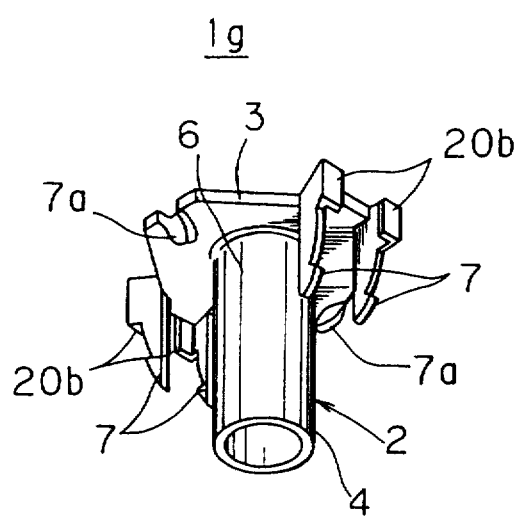
FIG. 15 is a perspective view showing the appearance of a Tee nut 1g according to a further embodiment of the present invention from below.

A Tee nut 1g shown in FIG. 15 is different from the Tee nut 1e shown in FIG. 13 or the Tee nut if shown in FIG. 14 in a point that extending members 20b which are located in proximity to each other are so bent as to extend toward each other.

Figure 16:
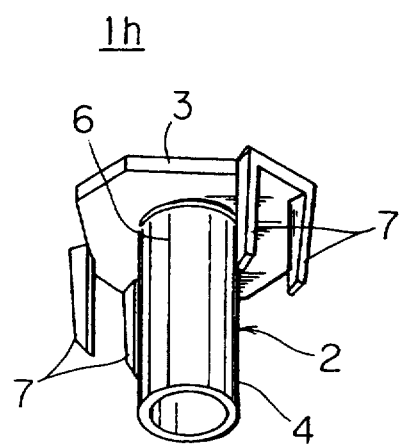
FIG. 16 is a perspective view showing the appearance of a Tee nut 1h according to a further embodiment of the present invention from below.

A Tee nut 1h shown in FIG. 16 is substantially different from the Tee nut 1c shown in FIGS. 10 and 11 in a point that pawls 7 are not indented.

Figure 17:
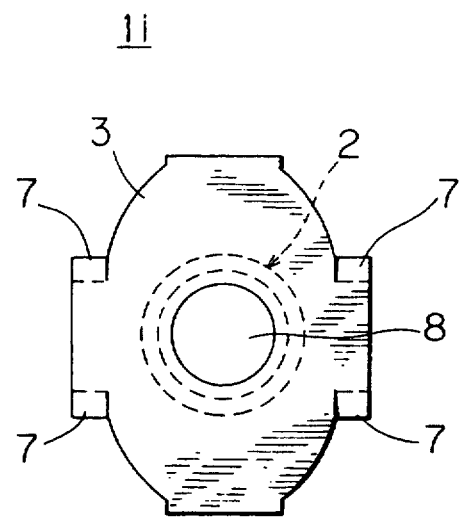
FIG. 17 is a plan view showing a Tee nut 1i according to a further embodiment of the present invention.

In a Tee nut 1i shown in FIG. 17, a flange portion 3 has a rectangular shape which is partially provided with arcuately extending edges.

Figure 18:
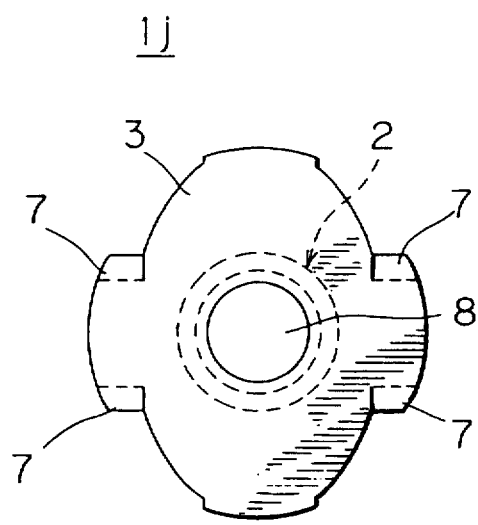
FIG. 18 is a plan view showing a Tee nut 1j according to a further embodiment of the present invention.

A Tee nut 1j shown in FIG. 18 is different from the Tee nut 1i shown in FIG. 17 in a point that all edges arcuately extend in a rectangular shape which is supplied to a flange portion 3. This flange portion 3 is substantially in the form of a circle in a stage before formation of pawls 7.

Figure 19:
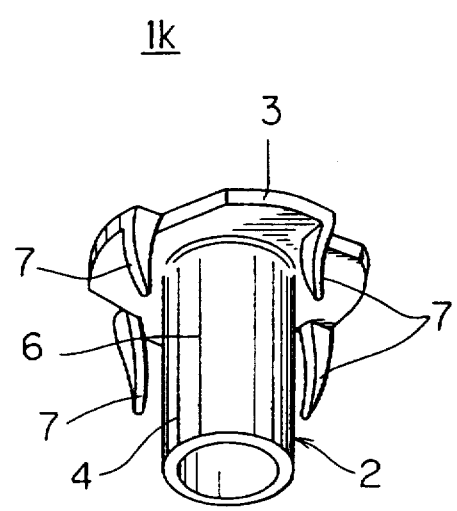
FIG. 19 is a perspective view showing the appearance of a Tee nut 1k according to a further embodiment of the present invention from below.

In a Tee nut 1k shown in FIG. 19, four pawls 7 are distributed at regular intervals on the outer peripheral edge of a flange portion 3. These pawls 7 are formed by raising up parts of the outer peripheral edge of the flange portion 3.

Figure 20:
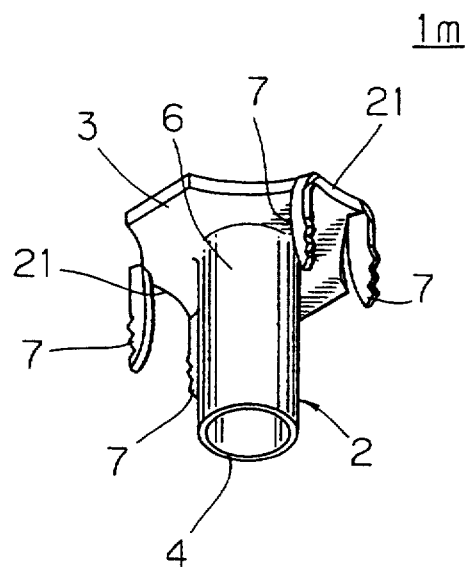
FIG. 20 is a perspective view showing the appearance of a Tee nut 1m according to a further embodiment of the present invention form below.
Figure 21:
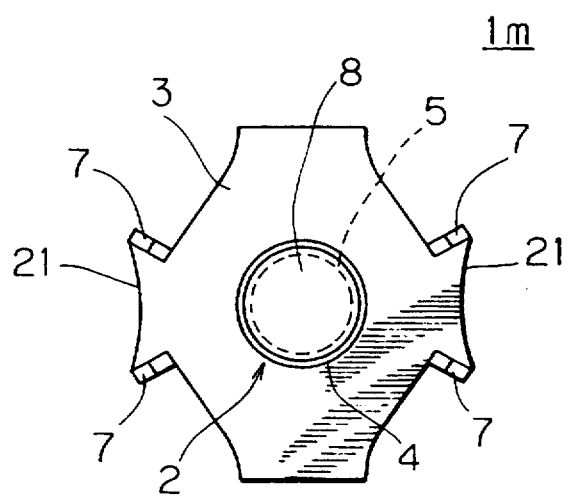
FIG. 21 is a bottom plan view of the Tee nut 1m shown in FIG. 20.
Figure 22:
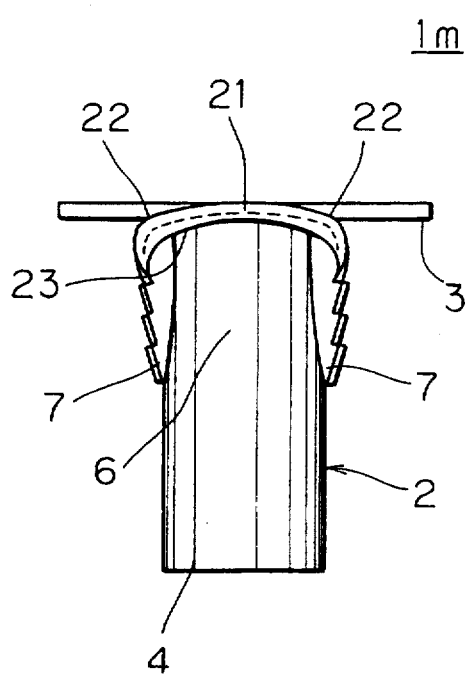
FIG. 22 is a side elevational view of the Tee nut 1m shown in FIG. 20.

FIGS. 20 to 22 show a Tee nut 1m of a "hopper feed Tee nut" type, which is characterized in shapes of outer peripheral edges of a flange portion 3 as compared with the Tee nut 1c shown in FIGS. 10 and 11. Between pairs of pawls 7 which are close to each other, the outer peripheral edges of the flange portion 3 define arcuate edges 21 for providing cavities. As clearly understood from FIG. 22, both ends of each arcuate edge 21 forming base portions of the pawls 7 are provided with rounded shapes 22. Further, each arcuate edge 21 is formed with a burr 23 which protrudes in the same direction as the pawls 7.

Although the present invention has been described and illustrated in detail, it is clearly understood that the same is by way of illustration and example only and is not to be taken by way of limitation, the scope of the present invention being limited only by the terms of the appended claims.

What is claimed is:

1. A Tee nut comprising a shaft portion and a flange portion outwardly extending from a first end of said shaft portion, said shaft portion and said flange portion being made of an integral metal material, said hollow portion being in the form of a hollow cylinder and having a portion to be caulked on a second end being opposite to said first end, a female threading being provided on its inner peripheral surface excluding said portion to be caulked, said flange portion being provided with a pawl projecting toward said second end of said shaft portion; and a closure member being engaged in said shaft portion for dividing said portion to be caulked from a female threading carrier portion provided with said female threading.

2. A Tee nut in accordance with claim 1, wherein said closure member is made of a material selected from a group of resin, a metal and wood.

3. A Tee nut in accordance with claim 1, wherein said portion to be caulked has an inner diameter which is made larger than that of said female threading carrier portion and a step is formed on the inner peripheral surface of said shaft portion for absorbing difference between said inner diameters, said closure member being positioned by said step.

4. A Tee nut in accordance with claim 3, wherein said closure member is in the form of a relatively thin sheet, which is arranged in the vicinity of the boundary between said portion to be caulked and said female threading carrier portion.

5. A Tee nut in accordance with claim 1, wherein said second end of said shaft portion has a sectional shape which is reduced in thickness toward its forward end.

6. A Tee nut in accordance with claim 1, wherein said flange portion has a substantially circular shape.

7. A Tee nut in accordance with claim 1, wherein said flange portion has a substantially polygonal shape.

8. A Tee nut in accordance with claim 1, wherein said pawl includes that formed by partially crushing the outer peripheral edge of said flange portion inwardly from the exterior.

9. A Tee nut in accordance with claim 1, wherein said pawl includes that formed by partially raising up the outer peripheral edge of said flange portion.

10. A Tee nut in accordance with claim 1, wherein a part of the thread of said female threading is irregularized.

11. A method of fixing a Tee nut in accordance with claim 1 to an a work piece, said method comprising the steps of:

arranging said Tee nut to direct said portion to be caulked toward a work piece;

driving said Tee nut into said work piece to advance said shaft portion into said work piece thereby forming a hole in said work piece to pass through the same while receiving a part of said work piece in said shaft portion, and to allow said pawl to bite into said work piece;

then discharging said closure member toward said second end of said shaft portion with said part of said work piece being received in said shaft portion; and caulking said portion to be caulked.

* * * * *

UNITED STATES PATENT AND TRADEMARK OFFICE
CERTIFICATE OF CORRECTION

PATENT NO. : 5,429,466
DATED : July 4, 1995
INVENTOR(S) : Nagayama

It is certified that error appears in the above-indentified patent and that said Letters Patent is hereby corrected as shown below:

Col. 3, line 24, replace "if" by --lf--;
      line 41, replace "form" by --from--.

Col. 4, line 60, delete "of fixation".

Signed and Sealed this

Third Day of October, 1995

Attest:

BRUCE LEHMAN

*Attesting Officer*      *Commissioner of Patents and Trademarks*